United States Patent [19]

Reidinger

[11] Patent Number: 5,231,689
[45] Date of Patent: Jul. 27, 1993

[54] WIDE ANGLE VIEWING ILLUMINATED INFORMATION DISPLAY ASSEMBLY AND PROCESS FOR MANUFACTURING SAME

[75] Inventor: Michael J. Reidinger, Beaver, Pa.

[73] Assignee: Tru-Lyte Systems, Inc., Beaver, Pa.

[21] Appl. No.: 852,681

[22] Filed: Mar. 17, 1992

Related U.S. Application Data

[60] Division of Ser. No. 330,595, Mar. 29, 1989, Pat. No. 5,101,466, and a continuation-in-part of Ser. No. 55,649, May 29, 1987, abandoned, which is a continuation-in-part of Ser. No. 828,200, Feb. 10, 1986, Pat. No. 5,040,320, which is a continuation-in-part of Ser. No. 538,797, Oct. 4, 1983, Pat. No. 4,569,571.

[51] Int. Cl.$^5$ .............................................. G02B 6/04
[52] U.S. Cl. .................................. 385/147; 385/115; 40/547; 359/443
[58] Field of Search ............... 385/147, 50, 31, 115; 359/452, 455, 900, 443; 40/547; 427/162, 163; 436/518

[56] References Cited

U.S. PATENT DOCUMENTS 4,537,861  8/1985  Elings et al. ................ 436/518
4,799,748  1/1989  Brown ......................... 385/31
4,888,076 12/1989  Martin ......................... 385/50

Primary Examiner—John D. Lee
Assistant Examiner—Phan Heartney
Attorney, Agent, or Firm—Louis E. Marn

[57] ABSTRACT

There is disclosed a light transmitting display assembly provided with a source of electromagnetic radiation in the visible spectrum and comprised of a display board containing information and formed with channels into which ends of optical fibers of an optical fiber bundle are selectively positioned and after positioning the surface of the display board is coated with microbeads wherein the source of electromagnetic radiation is directed into the other ends of the optical fibers of the optical fiber bundle to provide a light transmitting display assembly capable of wide angle viewing.

8 Claims, 3 Drawing Sheets

WIDE ANGLE VIEWING ILLUMINATED INFORMATION DISPLAY ASSEMBLY AND PROCESS FOR MANUFACTURING SAME

RELATED APPLICATIONS

This is a division of application Ser. No. 07/330,595, filed Mar. 29, 1989, now U.S. Pat. No. 5,101,466, and a continuation-in-part application of U.S. application Ser. No. 07/055,649, filed May 29, 1987 now abandoned which is a continuation-in-part of U.S. application Ser. No. 06/828,200, U.S. Pat. No. 5,040,320 filed Feb. 10, 1986, which is a continuation-in-part of U.S. application Ser. No. 06/538,797, filed Oct. 4, 1983, now U.S. Pat. No. 4,569,571.

BACKGROUND OF THE INVENTION

1. Field of the Invention

This invention relates to a light emitting information display assembly, and more particularly to an improved illumination display assembly of wide angle viewing.

2. Description of the Prior Art

In U.S. Pat. No. 4,569,571 there is disclosed a light transmitting assembly comprised of a screen assembly having a plurality of generally conically-shaped repeater orifices wherein an optical fiber of an optical fiber bundle is disposed within each repeater orifice and wherein the repeater orifices are enclosed with an optical fiber array disc and wherein the optical fiber bundle of the assembly is positioned between the screen assembly and a frame member onto which is displayed electromagnetic radiation, preferably in the visible range.

In the aforementioned co-pending U.S. application Ser. No. 07/055,649 now abandoned there is disclosed a light transmitting display assembly comprised of a display board containing information and having bulbous or tapered ends of optical fibers of an optical fiber bundle selectively positioned as known to one shelled in the art therein and wherein each bulbous end is overlayed or enclosed with a lens system for wide angle display together with a source of electromagnetic radiation in the visible spectrum which is directed onto the other ends of the optical fibers of the optical fiber bundle.

While effective to display the information, the process for manufacturing the display assembly requires an inordinate degree of tedium to ensure complete, overlay of a lens system for each optical fiber thereby increasing cost as well as the concomitant potential for incomplete overlay.

OBJECTS OF THE INVENTION

An object of the present invention is to provide a facile process for producing improved light transmitting information display assembly of wide angle viewing.

Another object of the present invention is to provide an improved light transmitting information display assembly of wide angle viewing.

Yet another object of the present invention is to provide an improved light transmitting information display assembly of wide angle viewing of improved visual effects.

SUMMARY OF THE INVENTION

The objects of the present invention are achieved by a light transmitting display assembly comprised of a display board containing information and formed with channels or orifices into which ends of optical fibers of an optical fiber bundle are selectively positioned and after positioning the surface of the display board is coated with a transparent or translucent resin in which is dispersed glass beads of a particle size of from about 50 microns to 1.0 mm and a source of electromagnetic radiation in the visible spectrum is directed into the other ends of the optical fibers of the optical fiber bundle to provide a light transmitting display assembly capable of wide angle viewing.

BRIEF DESCRIPTION OF THE DRAWINGS

These and other objects of the present invention will be readily appreciated by reference to the following detailed description when taken with the accompanying drawings wherein like numerals designate like parts throughout, and wherein.

DETAILED DESCRIPTION OF THE INVENTION

Figure 1:
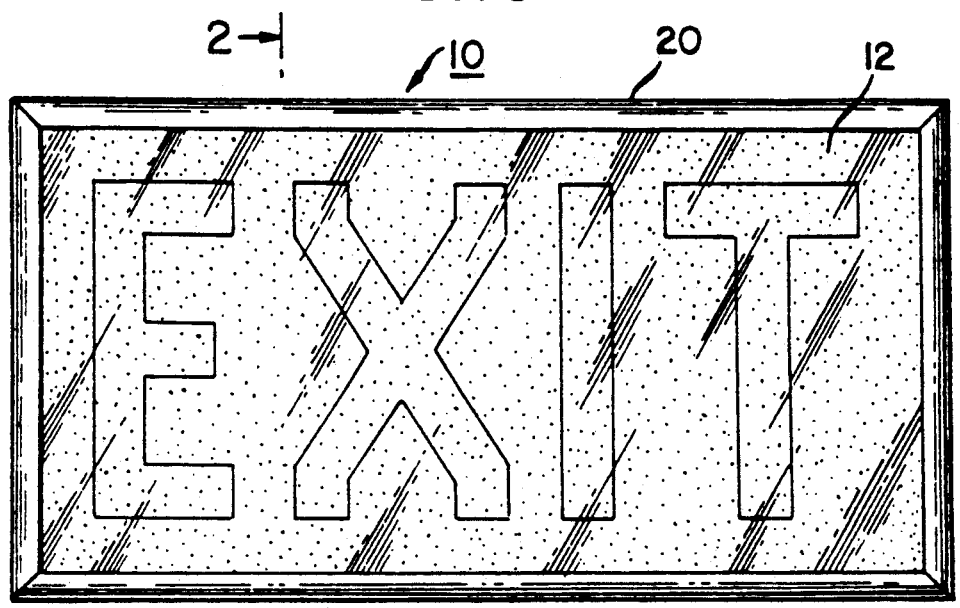
FIG. 1 is an elevational view of an information display assembly of the present invention.
Figure 2:
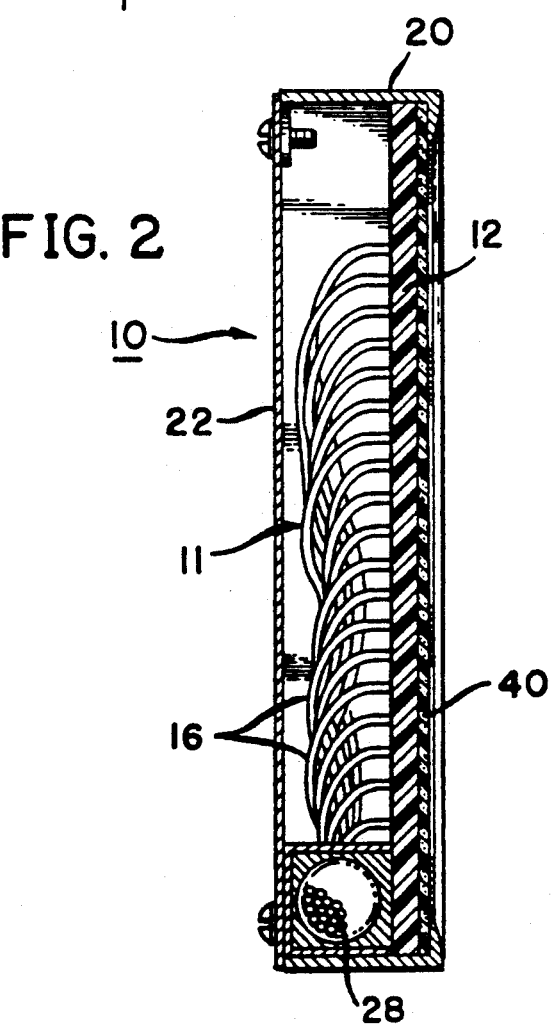
FIG. 2 is a schematic cross-sectional side view thereof taken along the lines II—II of FIG. 1.
Figure 3:
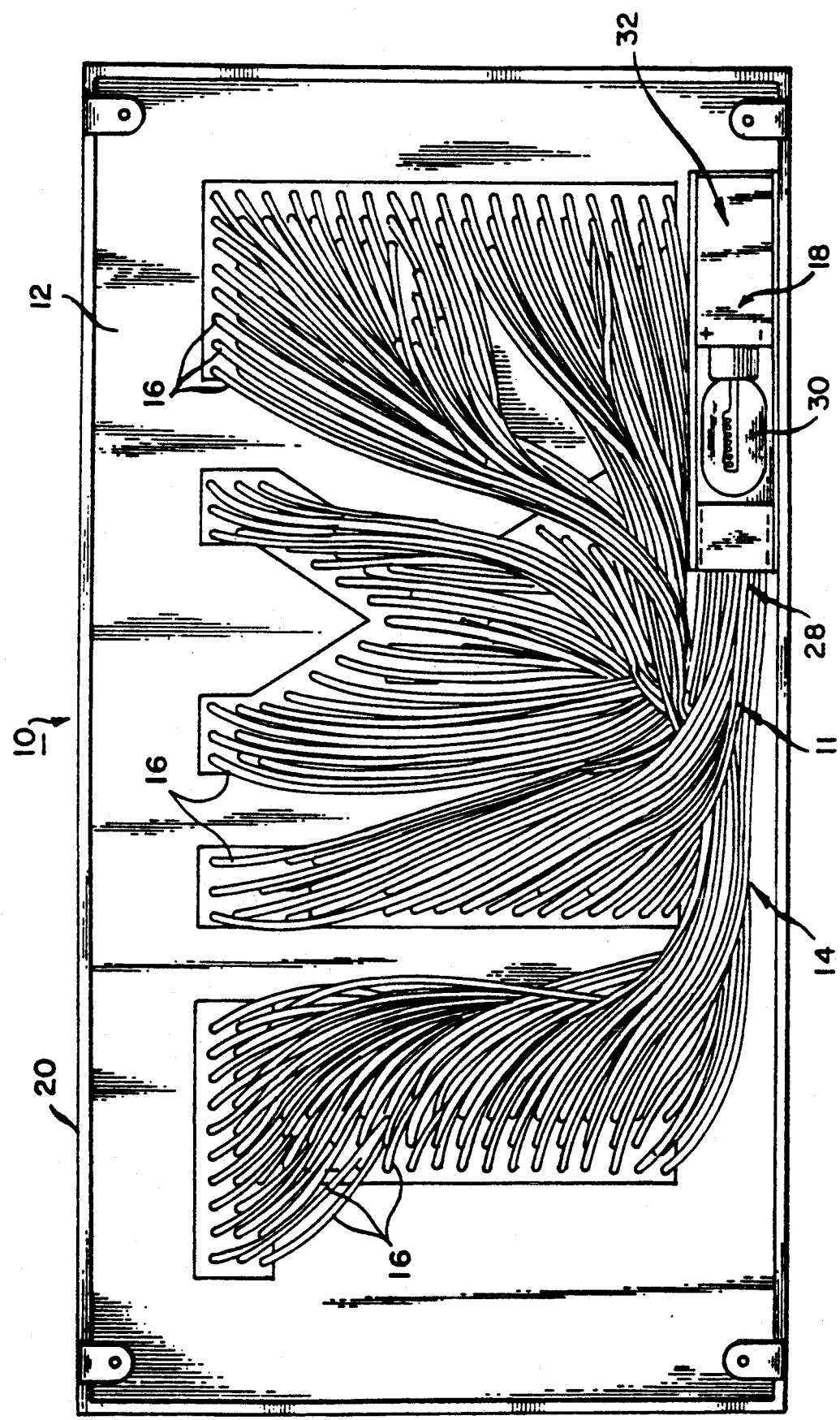
FIG. 3 is a rear view, somewhat schematic, of a display board of the information display assembly of FIG. 1.

Referring now to the drawings, and particularly to FIGS. 1 to 3, there is illustrated a light transmitting display assembly, generally indicated as 10, comprised of information containing display board of substrate 12, an optical fiber bundle, generally indicated as 14, comprised of a plurality of optical fibers 16 and an assembly including a source of electromagnetic radiation in the visible spectrum, generally indicated as 18, positioned in a housing 20 including a back wall 22.

Figure 5:
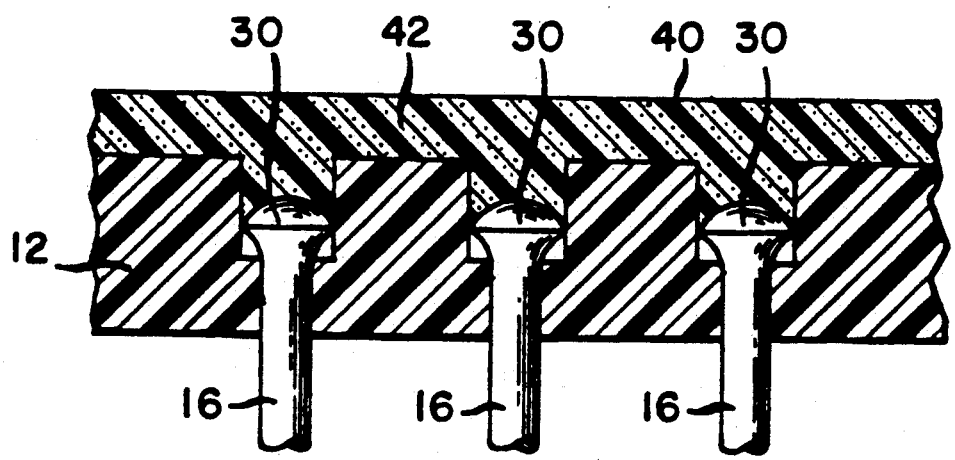
FIG. 5 is an enlarged partial cross-sectional view of the display board.

The display board 12 may be formed of any plastic material and by any molding technique (extrusion, injection, etc.) from the plastic resin, e.g. polystyrene or the like, together with a plurality of channels or orifices 24, referring specifically to FIG. 5. The channels may be of a diameter from 50 microns to 0.5 inches in predetermined array (rows and columns of even or uneven spacing) of a spacing of from 0.1 micron to 3.5 inches depending on visual effect and diameter of optical fibers to be used. The channels 24 may be generally V-shaped, as disclosed in the aforementioned U.S. Pat. No. 4,569,571, or formed of a channel portion 26 on a viewing side (V) of the display board 12 in coaxial or coherent alignment with a channel portion 28 of a smaller diameter on the non-viewing side.

Figure 4:
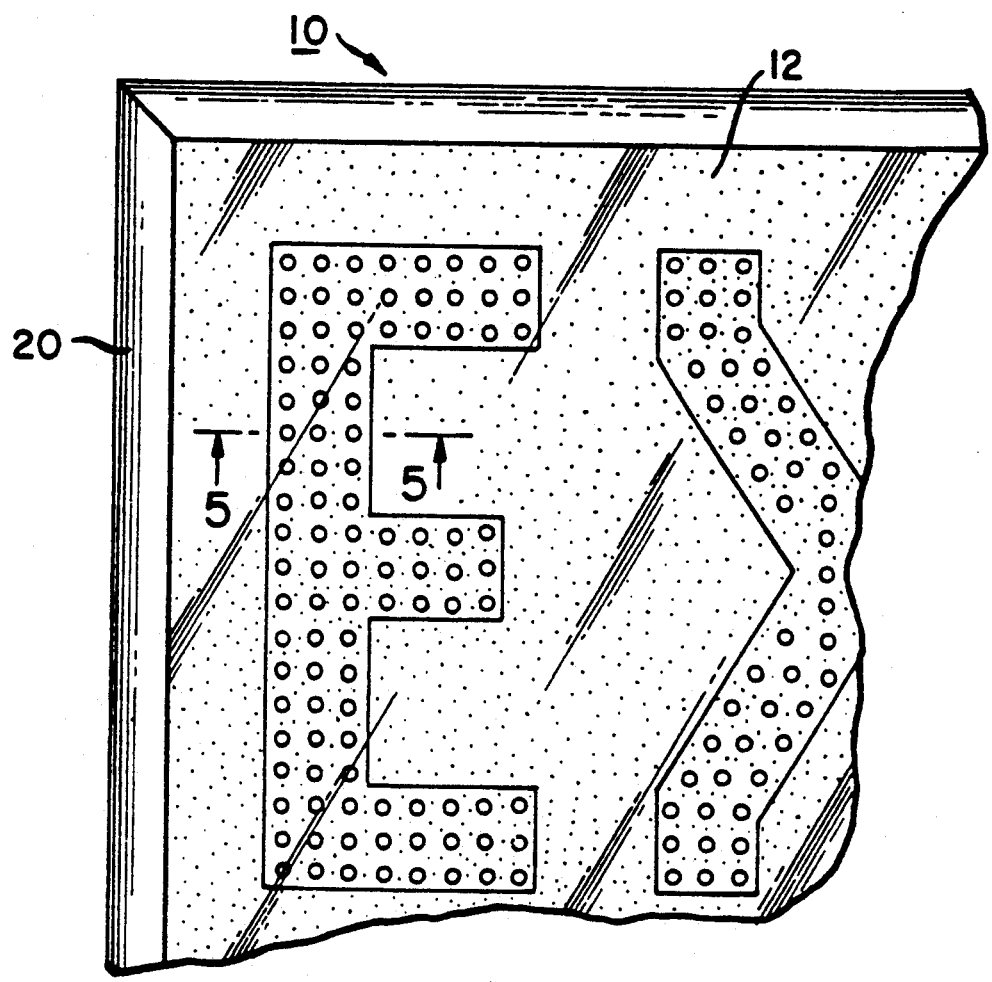
FIG. 4 is an enlarged partial view of letters of a word of the information display assembly.

The illustrated embodiment of the present invention is specific to an emergency "exit" sign with the word "EXIT" spelled in capital letters. Each letter is formed with straight line portions by silk screening, hand painting, the use of preformed letters, wood signs, etc., the non-informational portion; however, it will be understood that curved, random or other line form matrices may be used depending on intended use. In the embodiment herein described, the information portion is formed with a plurality of channels or orifices 24 in vertical and horizontal alignment with a spacing of from 0.5 to 10 mm between channels, referring particularly to FIG. 4, and constituting the information of the display board as more fully hereinafter described.

The optical fibers to be used in accordance with the present invention may be of a slightly smaller diameter of the smaller channel portion or orifice 28 to facilitate assembly of the display board 12. Generally, plastic or glass optical fibers are used of a diameter of from 100 microns to 0.5 inches with cladding of from 1 to 2 mm. In manufacture, each optical fiber 16 is cut to a predetermined length and an end thereof is heated to a temperature above its melting point for a time sufficient to form a bulbous or bell-shaped end 30, as illustrated in FIG. 5, or be pressed against a plate at a preset temperature as known to be skilled in the art.

Each thus formed optical fiber 16 is coursed through each of the channel portions 26 and 28 formed in the display board 12 to a point where the bulbous end 30 of each optical fiber 16 is wedged within a lower portion of the channel portion 26 or up against the surface in a manner to prevent further coursing of the optical fiber 16. The optical fiber 16 is fixedly positioned within the display board 12, such as by an epoxy resin system, generally disposed at the rear of the bulbous end 30 of each optical fiber 16 prior to final positioning in the display board 12.

After all the optical fibers 16 are positioned in the display board 12, the optical fibers 16 are preferably gathered up and formed into a convenient optical fiber bundle 14. The free ends of the optical fibers 16 are gathered and formed into a closely packed array and held in place by suitable means, for example bound into an epoxy resin. Once bound into such closely packed array, the thus bound end may be cut and polished to form a frame member 32, such as disclosed in U.S. Pat. No. 4,569,571, referring to FIG. 3, and positioned proximate a source 34 of electromagnetic radiation in the visible spectrum including, for example, a high-intensity laser light emitting diode or halogen bulb of the assembly 10. The source 34 may be connected to a power source, such as a battery 36 or as described in U.S. Pat. No. 4,201,005 to Hunt, incorporated herein by reference.

After positioning and fixing of the bulbous end 30 of the optical fibers 16, a transparent resin, in liquid form, in which is dispersed glass beads of a diameter of from 90 microns to 1 mm is coated on the viewing side (V) of the display board 12 to a thickness of from 50 microns to $\frac{1}{8}$". Generally, dispersion of the layer 40 including microbeads 42 is from 2 to 50%, preferably about 10-20% percent by volume of the resin. Generally, any resin which will solidify after a reasonable period of time by drying under ambient conditions or accelerated time periods at elevated temperatures, may be used in the coating dispersion; e.g. epoxy, etc. Additionally, while glass beads manufactured by Flex-o-lite, Inc. have been effectively used, beads formed of synthetic materials may also be used provided that such beads maintain structural integrity in the resin dispersion.

The coating resin for most applications is transparent, however, may be somewhat translucent or partially opaque and yet provide effective optical results. Additionally, by varying particle size distribution of the microbeads will vary visual effect in the fact that the particles will distribute themselves in the resin during curing, i.e. larger or heavier microbeads closer to the surface of the display board. Alternately, a plurality of coatings may be sequentially formed wherein each coating is of differing size distribution of microbeads, generally of successively smaller size distribution with each subsequent coating. While a single source of electromagnetic radiation in the visible spectrum is disclosed, it will be understood that more than one source may be employed depending on, inter alia, size, desired distance of visibility and recognition, etc., as will be understood by one skilled in the art. Additionally, the display board must be coated with a resin and thence with microbeads of desired size.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed is:

1. A method of forming an illuminated information display assembly, which comprises:
    positioning an optical fiber of an optical fiber bundle into each of a plurality of channels in a display screen substrate having a viewing side; and
    coating said viewing side with microbeads.

2. The method as defined in claim 1 wherein said microbeads are of a particle size of from 90 microns to 1 mm.

3. The method as defined in claim 1 wherein said microbeads are glass.

4. The method as defined in claim 1 wherein said microbeads are coated in a transparent coating surface of said viewing side.

5. The method as defined in claim 1 wherein said transparent coating includes UV stabilizers.

6. The method as defined in claim 1 wherein said coating is effected in a plurality of successive coating steps with microbeads of differing particle size.

7. The method as defined in claim 1 wherein successive coatings of microbeads are of successively decreasing particle size.

8. The method as defined in claim 1 when coating is effected by distributing microbeads on a resin layer disposed on said viewing side of said display screen.

* * * * *